United States Patent [19]

Stragier et al.

[11] 4,219,298

[45] Aug. 26, 1980

[54] RAPID RAIL

[75] Inventors: Marcel G. Stragier; Theodore J. Peterson, both of Scottsdale; John W. Bingman, Mesa; Julius A. Barker, Scottsdale, all of Ariz.

[73] Assignee: Government Innovators, Phoenix, Ariz.

[21] Appl. No.: 505,765

[22] Filed: Sep. 13, 1974

[51] Int. Cl.³ .......................... B65G 65/04; B65F 3/02

[52] U.S. Cl. .................................... 414/409; 414/544; 414/629

[58] Field of Search ............... 214/302, 303, 312, 313, 214/314, 147 G, 730, 651, 652, 653, 660, 75 R, 75 G; 414/406, 408, 409, 420, 544, 546, 629, 648

[56] References Cited

U.S. PATENT DOCUMENTS

| | | | |
|---|---|---|---|
| 1,379,007 | 5/1921 | Fernandez | 214/302 |
| 2,592,324 | 4/1952 | Oliver | 214/302 |
| 3,477,705 | 6/1969 | Stone | 214/302 |
| 3,516,562 | 6/1970 | Knight | 214/302 |
| 3,520,428 | 7/1970 | Puckett | 214/302 |
| 3,765,554 | 10/1973 | Morrison | 214/302 |
| 3,773,197 | 11/1973 | Blakeley et al. | 214/302 |
| 3,944,092 | 3/1976 | Ebeling et al. | 414/409 |

*Primary Examiner*—Lawrence J. Oresky
*Attorney, Agent, or Firm*—Knobbe, Martens, Olson, Hubbard & Bear

[57] ABSTRACT

A side loading refuse collection truck is equipped with apparatus for lifting containers from the ground at a random lateral distance from the side of the truck, elevating these containers above a refuse collection compartment of the truck and there inverting the container to allow the discharge through gravity of the refuse from the container to the truck. Thereafter, the apparatus permits replacement of the container alongside the truck at precisely the location where the container was first lifted, at the same random lateral distance from the side of the truck. The apparatus is conveniently operated by a single operator without manual handling of the container and is adapted to fit in narrow alleyways and roadways without protruding apparatus.

1 Claim, 15 Drawing Figures

RAPID RAIL

BACKGROUND OF THE INVENTION

This invention relates to refuse collection vehicles and elevating and dumping apparatus attached thereto and more particularly to side loading refuse collection vehicles designed to manipulate containers of standard size without direct manual intervention and handling by the vehicle operator.

The vast majority of residential refuse collection within the United States is accomplished using methods which require substantial manual handling. A large labor force is still utilized to manually dump refuse containers, typically 20 or 30 gallon garbage cans for household use, into a bin which is attached to a refuse collection vehicle.

The primary impediments to the utilization of labor saving devices in this field have been the absence of a refuse collection vehicle which is adapted to operate along narrow alleyways and roadways but still have sufficient operating flexibility to permit the mechanized engagement of standardized containers at a variety of spaced distances from the side of the refuse collection vehicle. In addition, the previous refuse collection vehicles have not been adapted to automatically replace refuse collection containers at the precise location from which they were picked up automatically, thereby requiring additional operator manipulation in order to assure that the containers are replaced out of the normal traffic flow through the roadway.

SUMMARY OF THE INVENTION

The present invention is directed toward a refuse collection vehicle, preferably side loading which is adapted to operate more rapidly and efficiently than prior collection systems. Moreover it can operate in relatively narrow alleys and roadways which would not permit sufficient access to allow a front loading or rear loading vehicle to maneuver to engage containers stationed alongside such roadway. The side loading apparatus is designed to engage containers at various arbitrary lateral spaced positions from the side of the vehicle, to elevate and dump these containers and to replace the containers automatically at the same position spaced identically from the side of the vehicle as before pick up. Few prior art devices had the ability to engage containers except at one lateral spacing from the vehicle, but even those which had this capability have generally required that the container be lifted slightly from the ground and moved laterally toward the vehicle manually before the container was raised and tilted for dumping the refuse therefrom. Thereafter, when the container was again lowered to ground level, the operator was required to laterally extend the container from the vehicle before setting it onto the ground and to guess at the approximate initial location of the container with regard to the vehicle. This operation consumed valuable time and provided for only approximate placement of the container.

In a preferred configuration, the present invention utilizes a vertical trolley system for carrying the refuse container to the top of the refuse collection vehicle and a combination of a curved track along which said trolley reciprocates and a cam system to tilt and dump the containers at the top of the refuse collection vehicle. The trolley system includes a pair of arms which are adapted to engage the containers and the entire elevating trolley system is designed for lateral reciprocation relative to the truck in order to permit the engaging arm to engage refuse collection containers at various locations from the side of the vehicle. The trolley system as well as the vehicle opening is adapted to elevate and tip the containers over the refuse collection opening in the vehicle within a broad range of extension of the trolley system from the side of the vehicle, so that the container may be elevated, dumped and replaced on the roadside without any movement of the vehicle or of the trolley system laterally with respect to the vehicle, therefore automatically placing the container precisely at the location from which it was initially picked up.

The engagement arms which are connected to the trolley system and designed to engage containers are normally carried in a storage configuration on the side of the vehicle in a raised position so that they do not extend from the side of the vehicle beyond the legal width where they could be dangerous to other vehicles or pedestrians, or limit the access of the vehicle along narrow alleys and roadways.

Through the location of the dumping mechanism on the side of the truck closely adjacent to the driver's cabin, it is convenient for the single truck operator to monitor all motions of the collection apparatus so that without ever leaving his operating station, he cannot only drive the truck but selectively engage and dump refuse containers along the roadway as he progresses. Due to the automatic operation of the collection apparatus, the operator can rapidly and efficiently collect refuse from various collection stations so that he is actually able to collect more refuse than an entire crew of men could previously accomplish using today's manual methods.

BRIEF DESCRIPTION OF THE DRAWINGS

These and other advantages of the present invention are best understood through a reference to the drawings in which.

Figure 10:
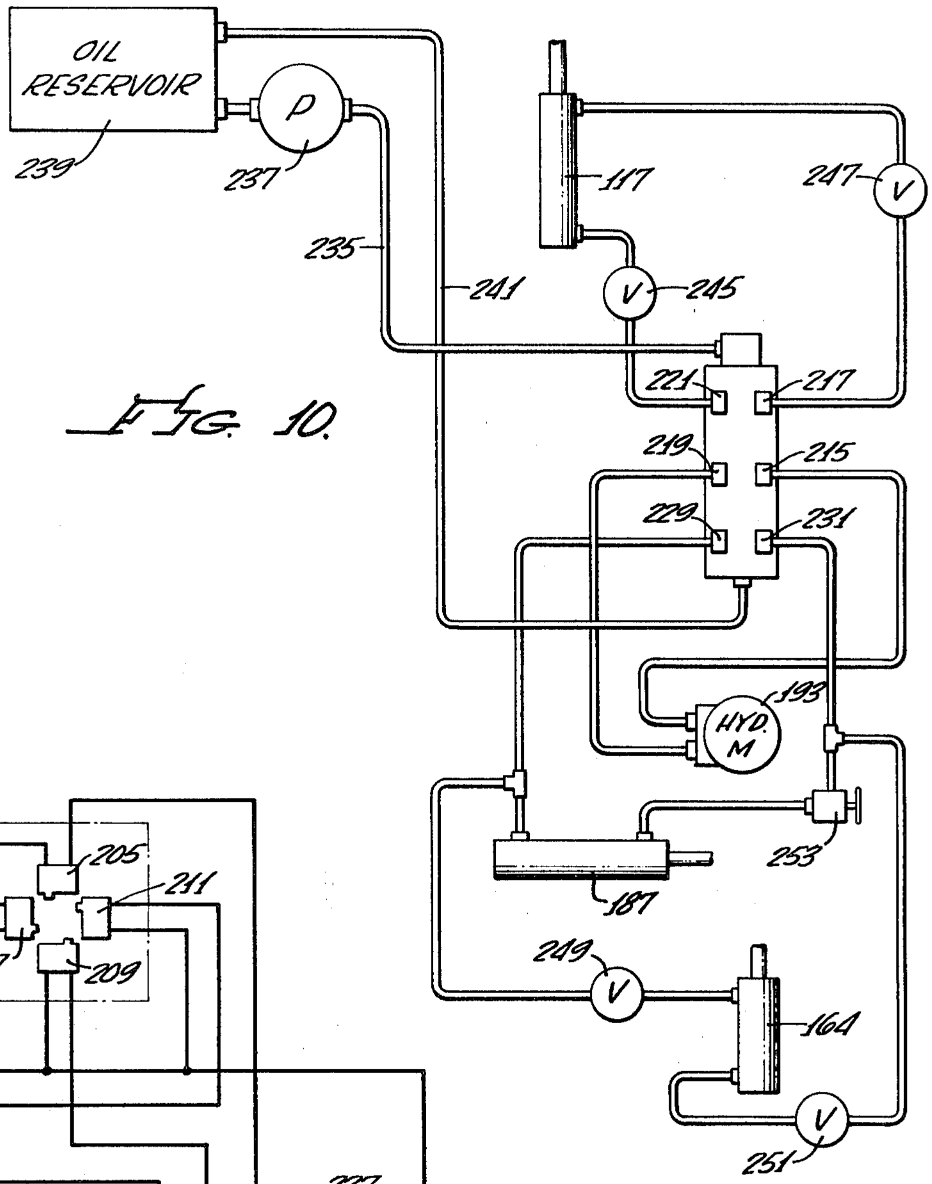
Figure 9:
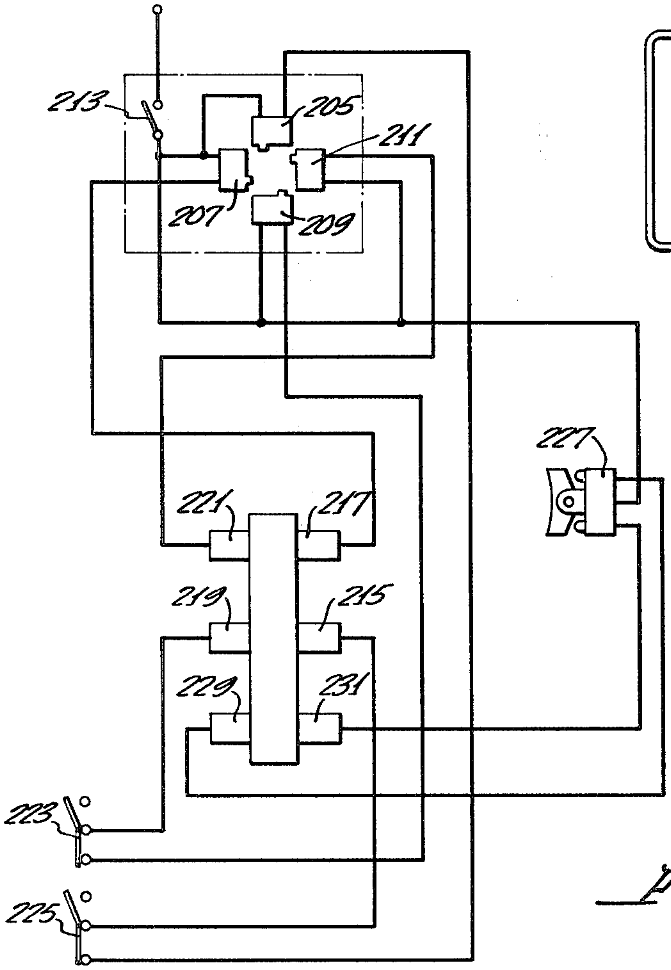

FIGS. **4*a*–8*a* are elevational schematic views related to FIGS. 4–8**, respectively, showing the operational steps of the present invention;

FIG. 9 is an electrical schematic diagram of the electrical system used for operating the present invention; and FIG. 10 is a hydraulic schematic diagram showing the hydraulic interconnections used for operating the hydraulic cylinders and motors of the present invention.

DETAILED DESCRIPTION OF THE PREFERRED EMBODIMENT

Figure 1:
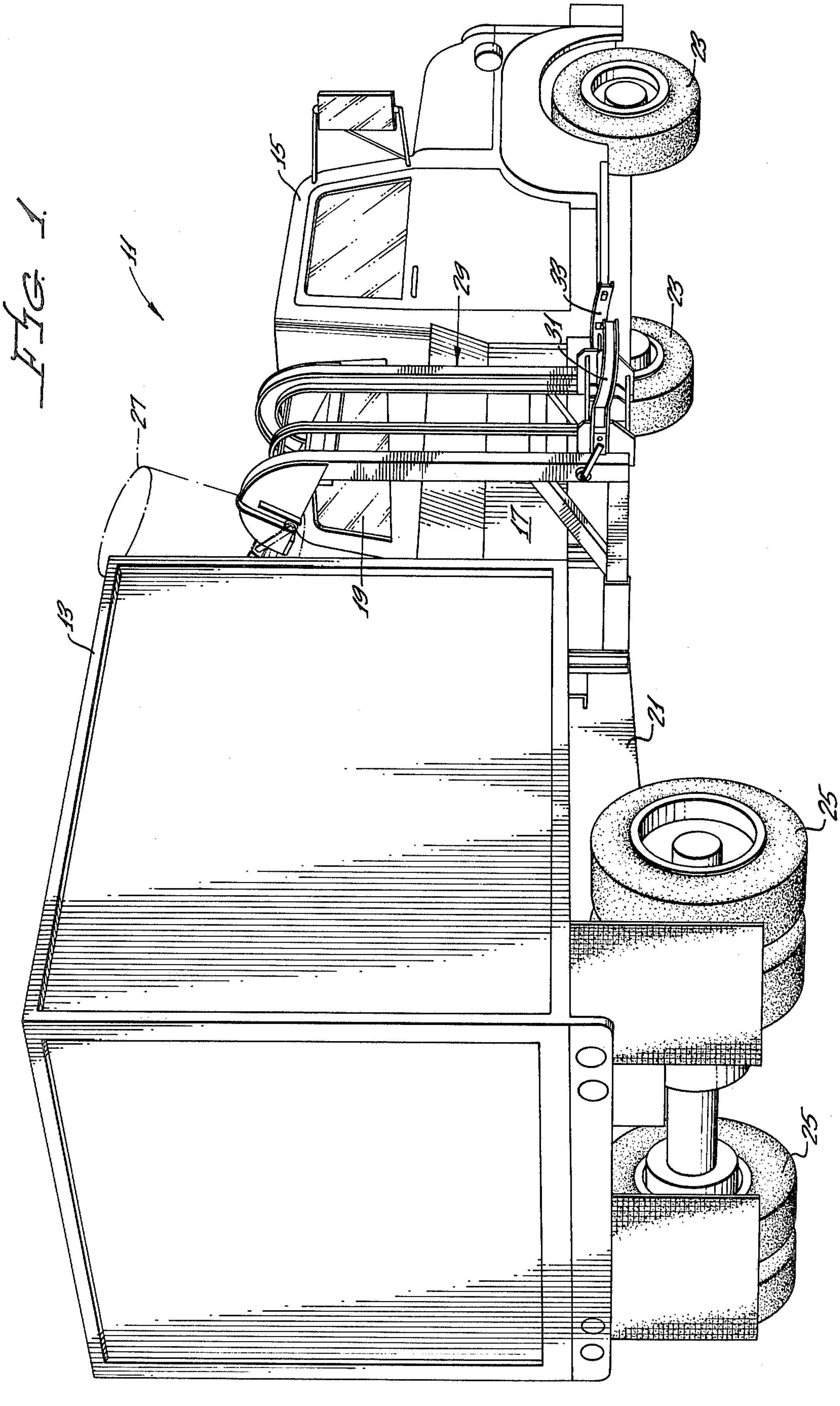
FIG. 1 is a perspective view of a side loading refuse collection vehicle with the container dumping apparatus attached thereto.

Referring initially to FIG. 1, a side loading refuse collection vehicle 11 is shown which includes a large storage compartment 13 at the rear of the vehicle which is separated from the driver cab 15 by a loading compartment or hopper 17. The loading compartment 17 is conveniently shorter than the storage compartment 13. The top of the loading compartment 17 is typically open to permit the contents of refuse containers to be deposited therein and the vehicle 11 typically includes a packer blade (not shown) which operates to force refuse from the loading compartment 17 into the storage compartment 13 through a frontal opening (not shown) in the storage compartment 13 and to densely pack the refuse in the storage compartment 13 to permit the vehicle 11 to transport the largest possible quantity of refuse.

The vehicle 11 is typically constructed on a strong channel frame structure 21 which mounts the operating components and the front steering wheels 23 and rear traction wheels 25. The vehicle 11 is driven through residential, commercial or other areas from site to site where refuse may be stored in refuse containers. In order to elevate and dump these containers, such as the container 27 of FIG. 1, the apparatus 29 of the present invention is firmly attached to the frame 21 of the vehicle 11. As can be seen from FIG. 1, the apparatus 29 includes a pair of engaging arms 31 and 33 designed to releasably engage refuse containers 27. The arms 31 and 33 are formed as horizontal circular segments for gripping circular containers and are positioned adjacent the side of the vehicle 11 and are within easy view of an operator within the cab 15 in any of the locations which they may assume, as more fully explained below. The operator of the vehicle 11 drives the vehicle, typically in a forward direction, until the arms 31 and 33 are laterally adjacent the refuse container 27 to be emptied. Only the standard driving wheels 23 and 25 are utilized to position the arms 31 and 33 relative to the container 27 in a direction along the longitudinal axis of the vehicle 11.

Figure 2:
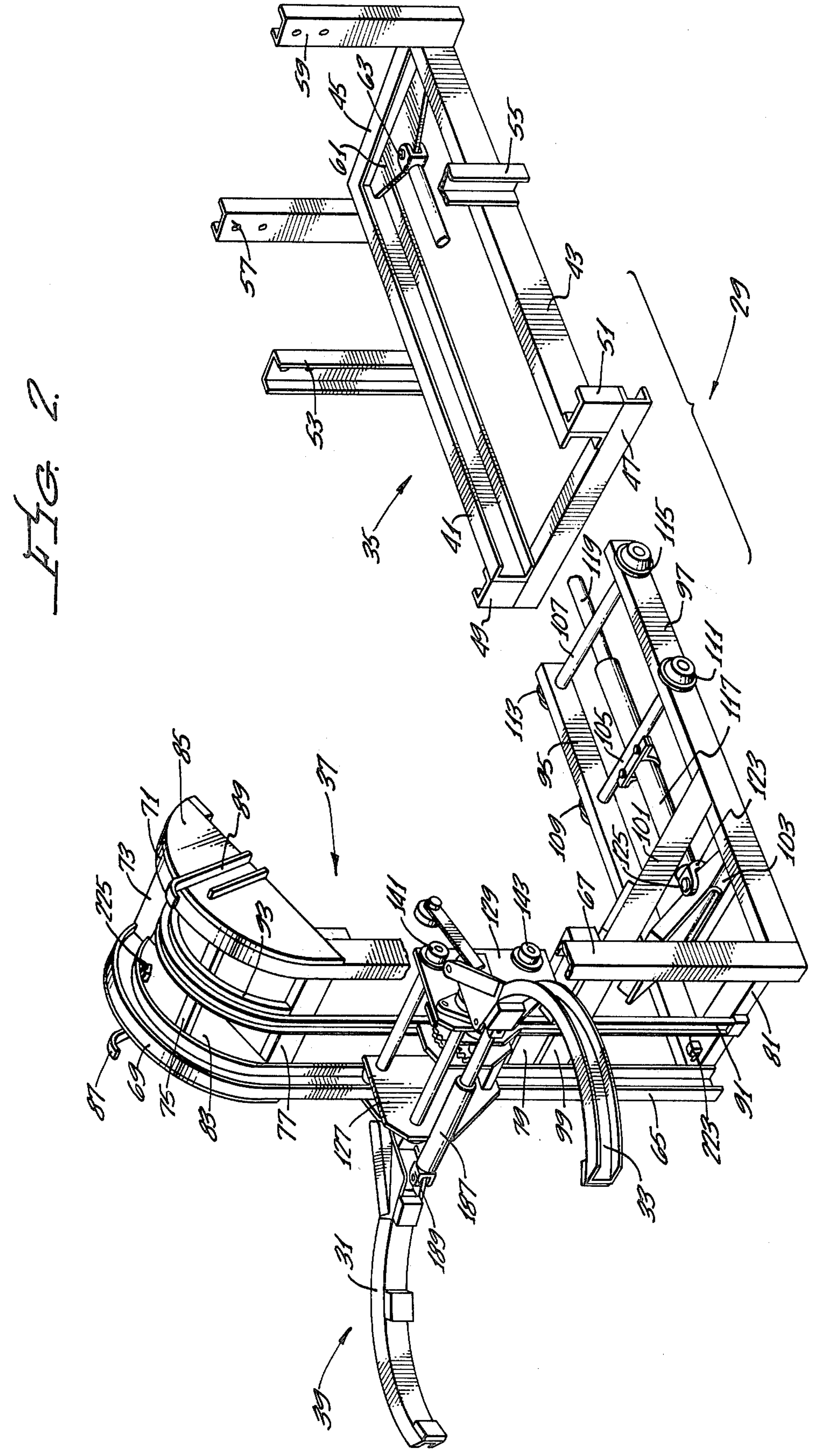
FIG. 2 is a perspective view, partially exploded of the elevating and dumping mechanism of the present invention removed from the refuse collection vehicle.

Referring now to FIG. 2, the construction of the apparatus 29 for elevating and dumping containers 27 will be described. This apparatus 29 includes three major subassemblies: a lateral rail assembly 35, a vertical rail assembly 37, and a trolley assembly 39. The lateral rail assembly 35 includes a pair of channel members 41 and 43 which form parallel lateral extended tracks joined at one end by a perpendicular channel 45 and at the other end by a perpendicular channel 47. The channel 47, as viewed in FIG. 2, is joined to the extended track channels 41 and 43 below the opening therein to allow access to the front ends of the channels 41 and 43. The interconnection between the members 41, 43 and 47 may conveniently be strengthened through the use of welded reinforcement blocks 49 and 51.

Four separate vertical channel members 53–59 are attached, as by welding, to the track channels 41 and 43 and extend above these channels 41 and 43 in order to mount the track channels 41 and 43 in a horizontal position beneath the channel frame 21 of the vehicle 11 (FIG. 1) by bolts (not shown) extending through holes in the channels 53–59 and the truck frame. The placement of the vertical channels 53–59 relative the channels 41 and 43 is located to match the vehicle 11 to which the lateral rails 41 and 43 are to be connected, the vertical channels 53 being long enough to clear any structure underlying the vehicle 11, but short enough to provide as much ground clearance for the vehicle 11 as is possible. The lateral positioning of the vertical members 53–59 is selected so that the channel 47 is approximately adjacent the lateral side wall of the loading compartment 17 of the vehicle 11 (FIG. 1). Each of the vertical channels 53–59 may conveniently include openings to accommodate the bolted attachment of the lateral rail assembly 35 to the vehicle 11.

Attached, as by welding, to the connecting channel 45, is a yoke 61 including a central opening for receipt of a pivot pin 63 which is used to control relative movement between the lateral rail assembly 35 and the vertical rail assembly 37.

The vertical rail assembly 37 includes a pair of parallel vertically oriented channels 65 and 67 arranged with facing openings. These channels 65 and 67 are arranged with their upper extremities mating with a pair of curved channel sections 69 and 71 which are parallel and face one another. The channels 65–71 therefore provide a smooth vertical and curved top rail system for operation of the trolley 39 as will be explained below. The position of the rails 65–71 is maintained by a plurality of cross braces 73–81 which are rigidly attached, as by welding, to the channels. Each of these cross braces is attached to the outside edge of the channels 65–71 in order to permit access to the inner rails of these channels, except for cross brace 73 which is utilized to close the upper end of the curved channel pieces 69 and 71. As additional strengthening members a pair of opposed semi-circular flat plates 83 and 85 are attached, as by welding, to the outside of the curved channels 69 and 71. These flat plate members serve, in addition, as mounting surfaces for a pair of cams 87 and 89, the function of which will be described below.

A roller chain 91 is affixed at its opposite ends to the cross brace 81 and the cross brace 73 and is stretched to a position as shown in FIG. 2 parallel to the channel tracks 65–71 throughout their entire length. In order to maintain this parallel relationship between the roller chain 91 and tracks 65–71 in the area of the tracks 69 and 71, a semi-circular chain rest 93 is attached, as by welding, between the cross braces 73 and 77. This chain rest is constructed to follow in a path parallel to the track channels 69 and 71. The chain is conveniently attached in a rigid fashion at one end, as at the end attached to the cross brace 81, but is attached through a tensioning member such as a bolt screwed through the strengthening member 73 and into a block at that end of the chain in order to permit tightening of the chain after its installation. The chain is wrapped through sprockets on the trolley 39 as will be explained below, and permits the trolley mechanism 39 to walk up and down the firmly attached chain in order to elevate itself.

The lower ends of the channels 65 and 67, as viewed in FIG. 2, are connected to a pair of horizontal box channels 95 and 97 which are parallel to one another and are spaced so that their outer dimensions are smaller than the innermost dimensions of the lateral channels 41 and 43. This spacing therefore determines the spacing between the parallel channels 65–71 as well as the spacing between a pair of diagonal braces 99 and 101 which are attached to the vertical channel 65 and 71 and the horizontal channel members 95 and 97, as by welding, to assure that these members maintain a perpendicular relationship.

Horizontal lateral strengthening members including a horizontal channel 103 and a pair of spaced horizontal axle rod members 105 and 107 are each rigidly attached to the horizontal channels 95 and 97. A pair of rollers 109 and 111 are rotatably connected to extending portions of the axle shaft 105 and similar rollers 113 and 115 are rotatably connected to extending ends of the axle shaft 107. Thus, while operating as transverse strengthening members, the shafts 105 and 107 serve the additional purpose of providing rigid non-rotating axles for the rollers 109 through 115. These rollers 109–115 are positioned to engage the upper and lower walls of the channels 41 and 43 of the lateral rail assembly 35 and permit the entire vertical rail assembly 37 to freely roll into and out of the lateral rail assembly 35. Since as explained previously, the lateral rail assembly 35 is positioned in an orientation with the channels 41 and 43 in a direction transverse to the longitudinal axis of the vehicle 11, the rollers 109–115 in conjunction with the channels 41 and 43 permit lateral movement of the vertical rail assembly 37 and its attached trolley 39. This latter movement is controlled through a hydraulic cylinder 117 having a double acting piston connected to a piston rod 119 which is in turn connected through the yoke 61 to the pivot pin 63. The cylinder 117 is connected at the other end through a yoke 123 and pivot pin 125 to the horizontal strengthening channel member 103. It can be seen from this arrangement that extension and contraction of the hydraulic cylinder 117 relative its piston rod 119 will extend and contract the vertical rail assembly 37 from the horizontal rail assembly 35 and therefore from the side of the vehicle 11. During these movements, the vertical rail assembly 37 will be maintained in its vertical orientation by the interconnection of the rollers 109–115 within the horizontal channels 41 and 43.

Figure 3:
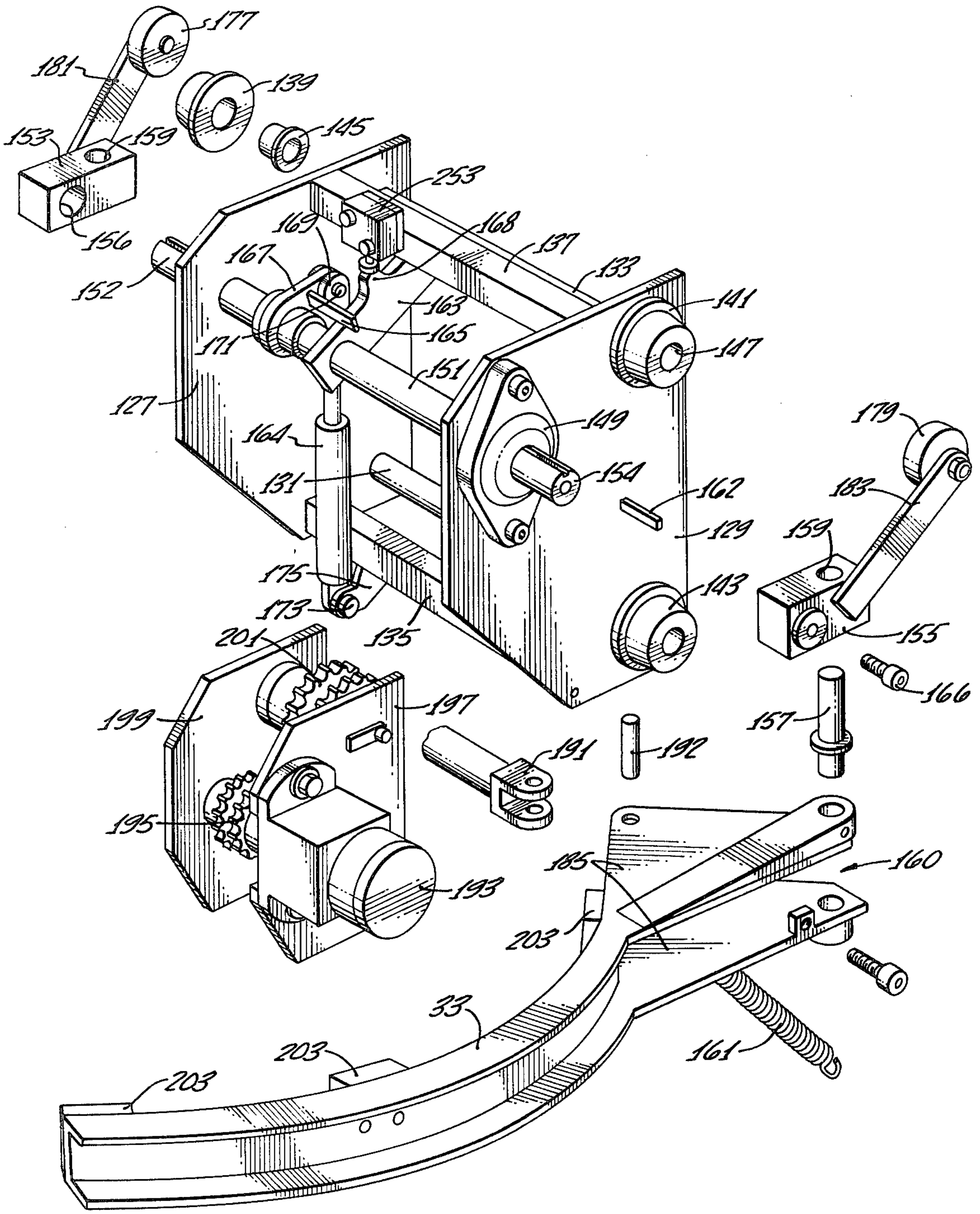
FIG. 3 is an exploded perspective view of the trolley mechanism and an engagement arm of the present invention.
Figure 8:
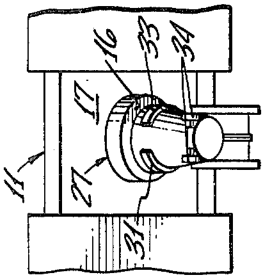
FIGS. 4–8 are plan schematic views showing the various operation stages of the present invention.

The operation of the trolley assembly 39 is best understood with reference to FIGS. 2 and 3. The basic structure of the trolley assembly 39 includes a pair of flat spaced parallel structural side plates 127 and 129 which are maintained in a parallel rigid configuration, as shown in FIG. 3, by a pair of axles 131 and 133 rigidly connected to each of the plates 127 and 129 as well as a pair of box members 135 and 137 which are attached as by welding, to the side plates 127 and 129. Each of the axle rods 131 and 133 extends at each end beyond each of the plates 127 and 129 to form a rotational mounting means for four rollers, three of which are shown at 139–143. These rollers are mounted, as by bearings 145 and 147, to the axles 131 and 133.

The rollers 139–143 are spaced such that they fit snugly within the vertical and curved upper track channels 65–71 of FIG. 2 and the side plates 127 and 129 are separated by a distance which permits these plates to lie within the channels 65–71. Positioned on opposite sides of the trolley assembly 39 and attached to the outside of the side plates 127 and 129 are a pair of bearing blocks, one of which is shown at 149. These bearing blocks rotationally support an axle shaft 151 which in turn, through a pair of mounting blocks 153 and 155, supports the container engaging arms 31 and 33.

More particularly, the outer ends 152, 154 of the shaft 151 are received in apertures 156 in the mounting blocks 153 and 155 and rotationally fixed to the mounting blocks by keys 162. The blocks 153, 155 are fixed axially on the shaft ends 152, 154 by set screws 166. Each of the container engaging arms, as shown by the arm 33 of FIG. 3, is connected to rotate about the axis of a short pin 157 which is firmly mounted through a yoke assembly 160 at one end of the arm 33. The pin 157 extends through an aperture 159 in the block 155, the block being positioned within the yoke 160. The pin 157 is free to rotate to move the arms between an opened position and a closed or engaging position. The vertical attitude of the arm 33 is controlled by rotation of the shaft 151 so that the arm 33 may be horizontal as shown in FIG. 3 or moved to a vertical position. The arm 33 is biased toward the horizontal position by a spring 161 which is connected to the lower portion of the side plate 129.

Rigidly attached to the axle shaft 151 is a lever arm 163 which may be used to position the attitude of the container engaging arms 31 and 33. This positioning is accomplished through engagement of a dog 165 which is attached to a rocker arm 167 which is mounted on the axle 151 but free to rotate thereon. Movement of the rocker arm 167 about the shaft 151 is controlled by a double action hydraulic cylinder 164 which through a yoke 169 and pivot pin 171 is connected to the rocker arm 167. The other end of the hydraulic cylinder 164 is connected by a pin 173 to a mounting bracket 175 which is attached to and protrudes from the box member 135. It can be seen from this assembly that extension of the hydraulic cylinder 167 can be accomplished without affecting the attitude of the engagement arms 31 and 33 since the dog 165 will rotate with the rocker arm 167 away from the lever arm 163. However, contraction of the hydraulic cylinder 167 will engage the dog 165 and lever arm 163 to rotate the axle shaft 151 and in turn to rotate the arms 31 and 33 in a clockwise direction as viewed in FIG. 3 to raise these arms to a vertical position. Likewise, if the hydraulic cylinder 164 is fully extended, allowing the engagement arms 31 and 33 to be placed in a horizontal position under the bias of spring 161 which causes the lever arm 163 to follow the movements of the dog 165, forces acting to rotate the engaging arms 31 and 33 in a clockwise direction which overcome the bias of the spring 160 can affect such a rotation since this movement will merely separate the lever arm 163 from the dog 165.

Such a rotation of the engaging arms 31 and 33 can be accomplished through a pair of cam followers in the form of rotating wheels 177 and 179 which are rotatably mounted on offset lever arms 181 and 183 respectively. These lever arms 181 and 183 are in turn rigidly attached to the mounting blocks 153 and 155. It will be recognized, therefore, that a camming action on the rollers 171 and 179 may be utilized to rotate the engagement arms 31 and 33 to a position relative the trolley 39 which is parallel to the path of trolley travel rather than perpendicular as shown in FIG. 3.

An inwardly extending yoke, such as the yoke 185 on the engagement arm 33, extends inwardly from the base of each of the engagement arms 31 and 33. These yokes are interconnected by a hydraulic cylinder 187 (FIG. 2) through a pair of yokes 189 and 191 and pins 192 at alternate ends of the cylinder 187. The hydraulic cylinder 187 serves to rotate the engagement arms 31 and 33 about the pins 157 in order to open and close these arms to disengage or engage a container respectively.

In order to move the trolley assembly 39 within the channels 65–71, a motor assembly is used comprising a hydraulic motor 193 and its associated drive sprocket 195 which is housed within a pair of vertical retaining plates 197 and 199 which are in turn rigidly connected to the horizontal support members 137 and 135 of the trolley assembly. The hydraulic motor 193 serves to rotate an axle shaft which is journaled within the mounting plates 197 and 199 in either of two directions and thereby to rotate the sprocket 195. A pair of idling sprockets, one of which is shown at 201 and the other of which is placed directly below the sprocket 201 are utilized to insure proper engagement of the chain 91 with the sprocket 195. The idling sprockets 201 are journaled to rotate within the mounting plates 197 and 199. The chain 91, as viewed in FIGS. 2 and 3, is placed to the right of the sprocket 201, to the left of the sprocket 195 and to the right of the second idling sprocket which is not shown, therefore insuring approximately 180° of rotation of the chain 91 about the drive sprocket 195. Through rotation of the hydraulic motor 193, the entire trolley assembly 39 can be made to walk up and down the chain 91 with the rollers 139–143 engaged within the channels 65–71 to guide the movement of the trolley 39. As will be recognized through a view of FIG. 2, the motion of the trolley 39 is vertical in the area of the vertical channel 65 and 67, but becomes a circular motion which inverts the trolley 39 in the area of the semi-circular channel 69 and 71. This semi-circular channel area and its cooperation with the trolley 39 serves to tip the container for dumping the refuse contents therefrom. It has been found, however, that it is inconvenient to continue the curved channels 69 and 71 to produce a total inversion of the containers held within the arms 31 and 33. Therefore, a pair of camming surfaces 87 and 89 are advantageously mounted on the plates 83 and 85 for engagement of the rollers 177 and 179. Thus, when the trolley 39 reaches a position approximately half way around the circular channels 69 and 71, the rollers 177 and 179 engage the camming surfaces 87 and 89 to rotate the shaft 151 and thereby rotate the engagement arms 31 and 33 as the trolley 39 progresses toward the end of the circular channels 69 and 71. This added rotation of the shaft 151 and its attached arms 31 and 33 assures abrupt and total inversion of the container with a jarring motion which will assure the removal of all of the refuse from the container. When the trolley is moved back toward the vertical channels 65 and 67, the springs 161 biasing the engagement arms 31 and 33 will bring the arms back into a horizontal position with the dog 165 engaging the lever arm 163, and lever arm 163 resting against support 137 to hold arms 31 and 33 in an approximately horizontal position.

Mounted inside each of the engagement arms 31 and 33 are a plurality of grip pads such as the pad 203. The use of these pads 203 assures a firm engagement between the engagement arms 31 and 33 and the container. In this respect, the containers preferably used with the present invention are shown in FIGS. 4–8 to comprise thin walled preferably thermoplastic material, such as polyethylene, formed as a truncated conical base section 14 extending to a horizontal lip section 16 which in turn extends to a truncated conical upper section 18, the horizontal lip section lending substantial rigidity to the plastic structure. The grip pads 203 preferably are designed to contort the sides of the container below the horizontal lip portion and thereby firmly engage the container. The container, therefore, preferably is sufficiently rigid to withstand this contorting force without buckling. On the other hand, the container preferably is sufficiently flexible to allow the grip pads 203 to distort the container in order to assure a maximum gripping strength. This configuration of the container with thin flexible plastic walls provides such structure.

The containers 27 have lids 28 which are removable and are hinged at 30 so as to be self-opening by gravity when dumped. The container lids preferably are curved or build-up to drain. The lids overlap the sides of the container but the overlapping portion 32 flares out from the sides so that it does not bind against the sides as the lid opens or if the container is distorted by the gripper.

The containers preferably have semi-pneumatic wheels 34 attached to the container on an axle so as to be readily moved by the user if needed. A handle formed as part of the container in the upper conical section above the wheels aids in such movement of the container much like a two wheeled dolly.

Figure 4:
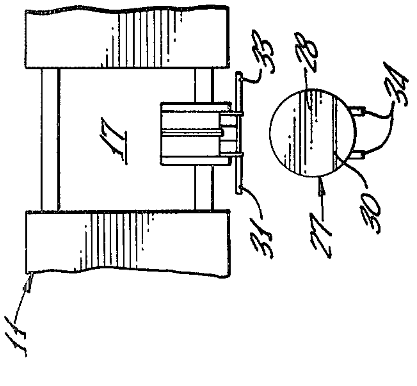
Figure 8A:
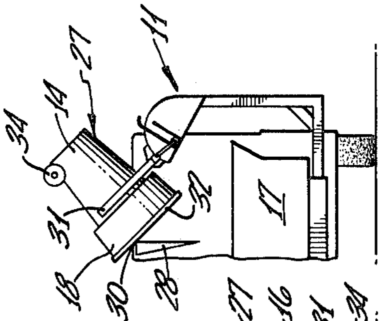
Figure 4A:
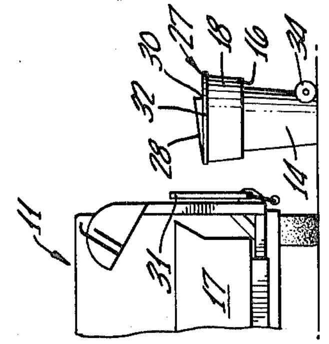

Referring now to FIGS. 4–8 and 4*a*–8*a*, the preferred method for utilizing the present invention in the collection of refuse from residences and commercial areas, particularly those which include narrow alleys and roadways, will be explained. Referring initially to FIGS. 4 and 4*a*, the refuse collection vehicle 11 is driven through the roadway or alley with the engagement arms 31 and 33 in a vertical position in order to maintain the vehicle 11 as narrow as possible and also to permit the vehicle as shown in FIG. 4*a* to approach very closely alongside a container 27. The arms 31 and 33 are maintained in this stowed or upright position through a contraction of the hydraulic cylinder 164 of FIG. 3. During this operation, the trolley 39 is advantageously at the bottom of the vertical channels 69 and 71 and the engagement arms 31 and 33 are advantageously in an open configuration caused by extension of the hydraulic cylinder 187.

Figure 7:
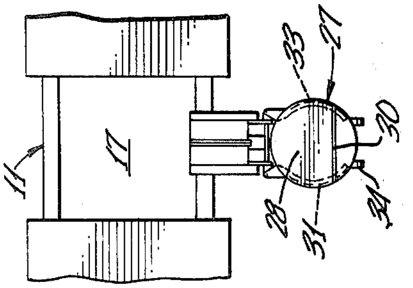
Figure 6:
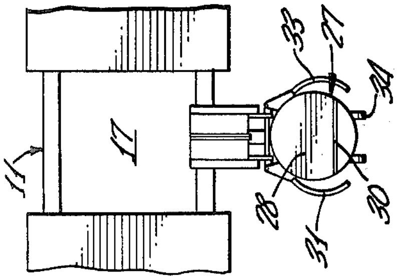
Figure 5:
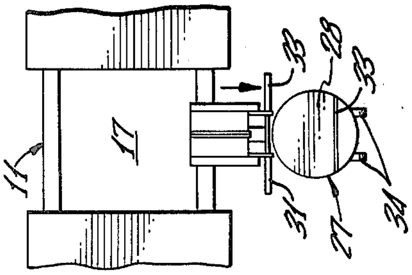
Figure 7A:
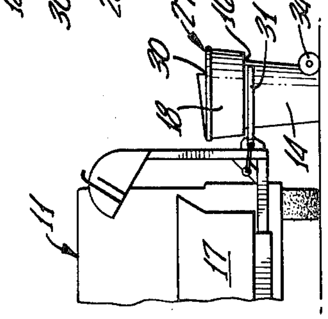
Figure 6A:
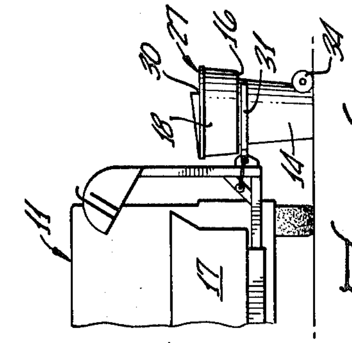
Figure 5A:
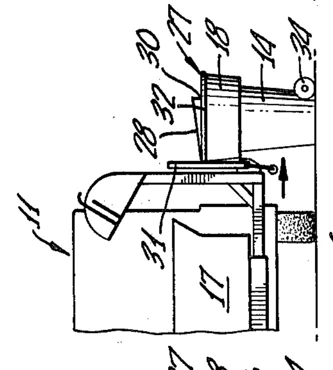

The operator slows the vehicle and approaches the side of the container 27 monitoring closely the position of the engagement arms 31 and 33 relative to the container 27 as shown in FIGS. 4 and 4*a*. The operator brings the vehicle to a complete stop when the engagement arms 31 and 33 as well as the entire lift mechanism is immediately laterally adjacent the container 27. Then, as shown by the arrow in FIGS. 5 and 5*a*, the operator extends the hydraulic cylinder 117 to move the entire vertical rail assembly away from the side of the vehicle 11 toward the container 27 until the engaging arms 31 and 33 are immediately adjacent the container 27. The operator then stops the movement of the hydraulic cylinder 117 and extends the hydraulic cylinder 164 to lower the engagement arms 31 and 33 from their stowed or vertical position to an extended or horizontal position as shown in FIGS. 6 and 6*a*. The operator then contracts the hydraulic cylinder 187 to engage the engagement arms 31 and 33 about either side of the container 27 to firmly grip the container 27 as shown in FIGS. 7 and 7*a*. From this position, without moving any of the hydraulic cylinders, the operator energizes the hydraulic motor 193 to walk the trolley assembly 39 up the chain 91, with the movement of the trolley 39 controlled by engagement of the rollers 139–143 in the channels 65–71. When the trolley assembly 39 reaches the upper portion of the curved channels 69 and 71, the cam followers 177 and 179 engage with the cam surfaces 87 and 89 rotating the axle shaft 151 and the engagement arms 31 and 33 along with the container 27 in a counterclockwise direction as viewed in FIG. 8*a* to abruptly jerk the container to a sufficiently inverted position above the refuse loading compartment 17 (FIG. 1) of the vehicle 11 to discharge the contents. The operator then returns the trolley assembly with the engaged container 27 down the channels 65–71 to the starting position of FIG. 7 which replaces the container 27 in precisely the location at which it was picked up. The arms 31 and 33 are then disengaged through an expansion of the hydraulic cylinder 187 as shown in FIG. 6, the hydraulic cylinder 164 is contracted in order to raise the arms 31 and 33 to the vertical or stowed position as shown in FIG. 5 and the hydraulic cylinder 117 is contracted to laterally withdraw the entire vertical rail assembly away from the container 27 to the position shown in FIGS. 4 and 4*a.*

It will be recognized that since the hydraulic cylinder 117 was not manipulated after an initial engagement of the container 27, the container 27 is replaced in the precise location from which it was initially picked up. This requires that the dumping position of the lifting mechanism be spaced sufficiently inboard of the outside of the loading compartment 17 of the vehicle 11 so that even when the vertical rail assembly 37 is fully extended away from the side of the vehicle 11, the refuse will still be dumped from the container into the loading compartment 17 rather than onto the roadway alongside the vehicle. This requires that the circular channel sections 69 and 71 have a sufficiently large radius so that when the trolley 39 is at the end of the channels 69 and 71 adjacent the cross member 73, the container will be spaced laterally inboard relative the vertical channels 65 and 67 a greater distance than the total allowable movement of the vertical channel assembly 37 within the horizontal channel assembly 35. The loading compartment of the vehicle 11 must also be sufficiently wide to permit containers to be dumped at a variety of lateral positions without spilling refuse on the ground alongside the vehicle. In one embodiment, the horizontal channel assembly 35 is long enough to permit the arms to be extended past cars parked along the curb to reach a container on the curb. In that embodiment it may be necessary to partially bring the arms back toward the truck before dumping to avoid spilling on the ground.

In order to permit the operator of the vehicle 11 to accomplish the various steps of the method outlined in FIGS. 4–8 using the apparatus disclosed in reference to FIGS. 1-3, an electrical control system as shown in FIG. 9 is utilized to control certain valves within a hydraulic control system shown in FIG. 10 to control the various hydraulic cylinders and motors of the apparatus of FIGS. 1-3 in a proper sequence.

The operator cab 15 of the vehicle 11 conveniently includes a joy stick type control handle which may be manipulated in four different directions from a vertical position by the operator. This joy stick control operates four separate switches 205–211. As can be seen from the arrangement of these switches 205–211 in FIG. 9, if the joy stick is positioned physically within the switch configuration and the pivot point is below the switches and the switch 211 is in a position closest to the front of the vehicle 11 a forward push on the joy stick handle will close switch 211. Similarly a rearward pull on the joy stick will close switch 207. A shift of the joy stick by the operator to the left will close switch 205 while a shift to the right will close switch 209. These switches are each energized through a master control switch 213 which is used to energize the entire electrical system. Thus, so long as the switch 213 is in an opened condition, any inadvertent manipulation of the joy stick will have no effect on the hydraulic assembly. Closing of each of the switches 205–211 is designed to close an associated hydraulic valve by activation of an electric solenoid for operation of the hydraulic cylinders and the motor. Thus, the switch 205 when closed will energize the solenoid valve 215 to open the valve 215 when the switch 205 is closed. A similar relationship exists between switch 207 and valve 217, switch 209 and valve 219 and switch 211 and valve 221. It will be noted that the electrical connections between the switch 205 and its associated valve 215 as well as between the switch 209 and its associated valve 219 are interruptable by limit switches 225 and 223 respectively which are normally closed. These limit switches are placed in locations as shown in FIG. 2 on the vertical rail assembly 37 and sense the extreme positions of the trolley 39 with respect to the vertical rail assembly 37. Thus, when the trolley assembly 39 is in its extreme lowest position on the vertical rail assembly 37, the switch 223 will be opened by engagement of the trolley assembly 39. Likewise, when the trolley assembly 39 is in its extreme uppermost position, the switch 225 will be opened thereby. These limit switches serve to deactivate the hydraulic motor 193 in order to avoid damage thereto as will be explained below.

A switch 227 may be included on the operator joy stick, this switch conveniently a normally neutral, three-position switch is operable to alternately open a first or second hydraulic valve 229 and 231 when the top or bottom of the switch is depressed respectively. Thus, through the single joy stick with its attached switch 227 the operator is able to separately and conveniently control the operation of six independent hydraulic valves. At the same time, it will be recognized that the use of the joy stick prohibits actuation of valves 221 and 217 simultaneously and likewise prohibits simultaneous actuation of valves 219 and 215. Similarly, switch 227 prohibits simultaneous actuation of valves 229 and 231. On the other hand, any one of these three pairs may be concurrently activated with the others; as 217, 219 and 229 may be concurrently activated and their associated operations proceed simultaneously.

Referring now to FIG. 10, the valves 215, 217, 219, 221, 229 and 231 are shown arranged in the hydraulic system. The valve assembly is connected through a conduit 235 to a high pressure oil source 237 and to a low pressure oil reservoir 239 through a second conduit 241. Each of the valves is arranged so that in its energized configuration it connects an output conduit to the high pressure conduit 235 to permit operation of dual action hydraulic cylinders. In its deenergized configuration it connects the output conduit directly to the low pressure line 241.

Valves 217 and 221 operate to control extension and contraction of the hydraulic cylinder 117 by alternately supplying fluid to the alternate ends of this cylinder 117. The hydraulic cylinder 117 extends and retracts the entire vertical track assembly 37 of FIG. 2 relative the vehicle 11 and the horizontal track assembly 35 of FIG. 2. It can be seen, therefore, that by manipulating the operator joy stick relative to the switches 207 and 211 of FIG. 9 the operator can alternately open the valves 221 and 217 to manipulate the cylinder 117. When viewed in the configuration of FIG. 9, and assuming that the switch 211 is the forwardmost switch in the vehicle 11, a rocking of the joy stick forward and backward will alternately close switches 207 and 211 alternately extending and contracting the cylinder 117. Flow rate control valves 245 and 247 may be adjusted to control the rate at which cylinder 117 extends or contracts and therefore the rate at which vertical truck assembly 37 moves laterally. The vehicle operator may therefore use this forward and aft motion of the joy stick to move the entire container elevating and dumping mechanism away from and toward the vehicle 11 as shown in the stop of FIG. 5 to adjust the engaging arms 31 and 33 adjacent the container 27.

Similarly, the valves 219 and 215 are connected to conduct high pressure hydraulic fluid in alternate directions through the hydraulic motor 193 which as explained in reference to FIG. 3 is utilized to drive the trolley assembly 39 up and down the channel track 65–71. By rocking the joy stick to the right, as shown in FIG. 9, switch 209 can be closed to operate valve 219 to an open condition thereby lowering the trolley 39 on the channels 65–71. Alternately, the joy stick can be rocked to the left closing switch 205 and raising the trolley 39. The limit switches 223 and 225 serve to limit the travel of the trolley 39 along the channels 65–71 by closing the valves 219 and 215.

Similarly, the switches 229 and 231 alternately provide hydraulic high pressure oil to alternate ends of the hydraulic cylinders 164 and 187 to sequentially lower the arms 31 and 33 to a horizontal position as shown in FIG. 6 and then grip the container as shown in FIG. 7. Likewise, the reverse operation of the valves 229 and 231 will sequentially open the gripping arms 31 and 33 and then raise them to the stowed position shown in FIG. 5. The valves 229 and 231 are responsive to the three-position switch 227 on the joy stick so that a simple squeezing of the top end of the switch 227 will automatically lower the arms 31 and 33 to the extended position and cause these arms to engage the container. A pair of flow rate control valves 249 and 251 control the flow of fluid in alternate directions from the cylinder 164 while a hydraulic switch 253 is utilized to control the flow of hydraulic fluid to the cylinder 187 to sequence the gripping operation of a container. Hydraulic switch 253 is activated by arm 163, as shown in FIG. 3, as arms 31 and 33 reach their horizontal position allowed by the extension of cylinder 164 a burr 168 on the arm 163 activates hydraulic switch 253 allowing oil to flow to cylinder 187 which closes arms 31 and 33. By properly adjusting the flow control valves 249 and 251 it is possible upon the actuation of the three-position switch 227 to operate the cylinder 164 abruptly and the cylinder 187 slowly so that the arms 31 and 33 are first quickly lowered to a horizontal position and then slowly grip the container. When the reverse operation is desired upon squeezing the bottom end of switch 227 the cylinder 187 may quickly release the container since no flow control is included in the release line of the cylinder 187 while the stowing cylinder 164 operates slowly and therefore operates only after the container has been released. This dual operation in response to the trigger permits simple and easy operation of the entire system by the operator.

From the foregoing description it is clear that an extremely simple mechanism has been described which is easily repaired and maintained while permitting fast and convenient collection of refuse along collection routes. The use of compatible refuse containers allows the manipulation of such containers without adjustment of the size and spacing of the pick up arms 31 and 33. Furthermore, the use of the simple joy stick mechanism allows an operator to devote his attention entirely to the operation of the mechanism which may be visually monitored adjacent the operator's cab while manipulating the joy stick with a single hand.

The hopper 17 preferably is large enough to receive the contents of several containers. As it becomes nearly full, the operator activates a compactor which transfers refuse from the hopper to the main storage compartment 13 and compacts the refuse as it does so. Preferably the transfer and compaction step is performed while the truck is en route between collection stations.

The design of this collection device makes it readily adaptable for installation on, and removal from, a variety of existing refuse collection vehicles. Some such vehicles may still be used for their normal mode as front-end loaders or rear-end loaders even after being fitted with the device of this invention.

It will be understood that various modifications to the preferred embodiment could be made within the scope of this invention. For example, the vertical rails 65 and 67 could be straight instead of cave-shaped and the container dumped with a cam or the hydraulic cylinder 164 which raises the fingers. The vertical rails 65 and 67 might be pinned at the bottom and pivoted back by a hydraulic cylinder replacing diagonal supports 101 to accommodate dumping with less interference from fences or other obstructions. The vertical rails 65 and 67 might be pinned at top and bottom, with the container weight transferred to the truck body by tensile loading at the top of the body. The horizontal trolley 29 might be affixed to a turntable so as to turn about a vertical axis to increase the reach and flexibility and to turn containers, engage turned containers, or allow the truck to progress during the dumping cycle.

One exemplary system utilizes 300 gallon containers holding up to 1,000 pounds in refuse, with a gripping force of about 200 pounds radial force applied near the middle of the container. This provides the desired flexing of the container to ensure a firm grip while the upper conical portion prevents excess distortion.

What is claimed is:

1. In a trash collection system having a frame attached to the side of a trash collection vehicle and including a pair of parallel guide rails each extending upwardly in a substantially vertical plane and having curved portions at the top thereof, said system including a carriage mounted on said guide rails for movement therealong, the apparatus comprising: track means positioned parallel to said guide rails; a pair of gripping arms secured to said carriage, each of said arms pivotable about a horizontal axis for movement to a vertical plane and pivotable about a vertical axis for movement to and from each other for gripping a trash container; means secured to said frame for laterally extending said guide rails, carriage, and gripping arms mounted thereon outwardly from said vehicle for positioning said gripping arms with respect to a trash container; and a motor mounted on said carriage for movement therewith and having means engaging said track means for driving said carriage along said guide rails.

* * * * *